United States Patent [19]  [11] Patent Number: 4,902,484
Martin et al.  [45] Date of Patent: Feb. 20, 1990

[54] OXYGEN INJECTOR MEANS FOR SECONDARY REFORMER

[75] Inventors: Richard R. Martin; Earl W. Schnell, both of Tulsa, Okla.

[73] Assignee: John Zink Company, Tulsa, Okla.

[21] Appl. No.: 150,448

[22] Filed: Jan. 28, 1988

Related U.S. Application Data

[63] Continuation of Ser. No. 756,915, Jul. 18, 1985, abandoned, which is a continuation of Ser. No. 518,090, Jul. 28, 1983, abandoned.

[51] Int. Cl.4 .............................................. B05B 1/06
[52] U.S. Cl. .................................. 422/189; 239/127.1; 239/127.3; 239/132.3; 422/220; 422/310; 423/359; 423/361; 431/148; 431/159; 431/160
[58] Field of Search ....................... 422/189, 220, 310; 423/359, 361; 431/148, 159, 160; 239/127.1, 127.3, 132.3

[56] References Cited

U.S. PATENT DOCUMENTS

| | | | |
|---|---|---|---|
| 3,477,824 | 11/1969 | Reed | 422/220 |
| 3,504,856 | 4/1970 | Hinkeldey et al. | 239/132.3 |
| 3,612,738 | 10/1971 | Jones et al. | 431/160 X |
| 3,743,814 | 7/1973 | Oakes | 239/132.3 X |
| 3,827,632 | 8/1974 | Rymarchyk et al. | 239/132.3 |
| 3,833,209 | 9/1974 | Chang | 239/132.3 |
| 3,901,445 | 8/1975 | Chang | 239/132.3 |
| 3,912,244 | 10/1975 | Chang | 239/132.3 |
| 4,166,834 | 9/1979 | Reed et al. | 422/148 |
| 4,322,033 | 3/1982 | Rymarchyk et al. | 239/132.3 |
| 4,414,191 | 11/1983 | Fuderer | 422/148 X |
| 4,427,186 | 1/1984 | Bührmann | 239/132.3 X |
| 4,432,534 | 2/1984 | Zanetta et al. | 239/132.3 |

Primary Examiner—Barry S. Richman
Assistant Examiner—Jill Johnston
Attorney, Agent, or Firm—Head & Johnson

[57] ABSTRACT

An oxygen injector assembly for directing substantially pure oxygen into the path of an effluent or exhaust stream from a primary reformer process for mixing of the oxygen with the effluent, the assembly comprising an oxygen delivery tube for discharging the oxygen into the path of the effluent, and a cooling jacket disposed around the outer periphery of the delivery tube for moderation of the ambient temperature conditions surrounding the oxygen injector assembly and thus compensating for the increased temperature conditions created by the mixing of the oxygen with the effluent in lieu of mixing air therewith.

2 Claims, 3 Drawing Sheets

OXYGEN INJECTOR MEANS FOR SECONDARY REFORMER

This is a continuation of application Ser. No. 06/756,915 filed on July 18, 1985 which is a continuation of Ser. No. 06/518,090 filed July 28, 1983, both of which are now abandoned.

BACKGROUND OF THE INVENTION

1. Field of the Invention

This invention relates to improvements in apparatus for directing oxygen into an effluent in a hydrocarbon secondary reforming process and more particularly, but not by way of limitation, to an apparatus having means for protection of the delivery equipment from the excessive heat created by the use of oxygen in a hydrocarbon secondary reforming process.

2. Description of the Prior Art

In the synthesis of ammonia it has been a practice to reform methane with steam to obtain hydrogen for combination with nitrogen to form anhydrous ammonia. This process has normally been carried out in apparatus referred to as a Primary Reformer, which adds heat to the mixture of steam and methane in the presence of a catalyst. The temperature level that may be attained in this type apparatus is limited and a large portion of the methane is not reacted. In order to obtain the reaction of a greater volume of the methane, it is considered necessary to utilize a Secondary Reformer in which the carbon monoxide, hydrogen and methane effluent or exhaust from the Primary Reformer is burned by the introduction of air to provide a temperature level of at least twenty-two hundred degrees Fahrenheit. At such temperatures the effluent from the Primary Reformer in the presence of the catalyst reacts with the residual methane to produce additional hydrogen and carbon monoxide. The hydrogen thus produced is combined with nitrogen for the production of anhydrous ammonia.

Secondary Reformer apparatus for achieving this increased efficiency is disclosed in the Reed U.S. Pat. No. 3,477,824, issued Nov. 11, 1969, and entitled "Burner and Apparatus for Reforming Hydrocarbons" and in the Reed et al U.S. Pat. No. 4,166,834, issued Sept. 4, 1979, and entitled "Air Injector Nozzle for Secondary Reformer." These devices generally comprise a housing or header having an inlet in communication with the exhaust or effluent from the Primary Reformer for receiving the effluent therefrom. The housing is secured to or in open communication with a reactor (or reaction vessel), or the like, containing a catalyst and wherein the secondary reforming process takes place. An air supply or air delivery pipe extends into and through the housing or header means and is provided with nozzle means, or the like, at the lower end thereof for injecting the air into the effluent flow stream at the proximity of the entry of the effluent into the reactor (or reaction vessel), or the like.

It has been discovered that the introduction of pure oxygen into the effluent in the secondary reformer process in lieu of the air stream greatly increases the efficiency of the secondary reformer operation. However the use of pure oxygen, or pure oxygen in combination with steam creates excessively high temperatures within the reactor (or reaction vessel), or the like, during the secondary reformer process. For example, the temperatures may reach three thousand degrees Fahrenheit in the reactor. One disadvantage of the use of oxygen in this process is that the excessively high temperatures are transmitted to the oxygen injector or delivery means and is destructive to the construction thereof. As a result, the useful life of the oxygen delivery means is relatively short, thus increasing the overall cost of the equipment and reducing the efficiency thereof.

SUMMARY OF THE INVENTION

The present invention contemplates an improved delivery or injector means for introducing oxygen into the flow stream or effluent exhausted from a Primary reformer process in a manner overcoming the foregoing disadvantages. The novel injector means comprises a delivery pipe or passageway extending into and through a housing or header means which is secured to the usual reactor or (reaction vessel), or the like, commonly used in a Secondary Reformer operation. The housing is provided with inlet means for receiving the effluent from the Primary Reformer process, and the effluent is directed through the annulus between the outer periphery of the delivery pipe and the inner periphery of the header means and into the reactor or (reaction vessel), or the like. The delivery pipe is provided with one or more discharge ports or nozzle means at one end thereof for injecting the oxygen into the flowing effluent stream substantially immediately prior to entry of the effluent into the reactor or (reaction vessel) whereupon the oxygen mixes with the effluent to produce an efficient burning of the combustible components of the effluent. A cooling jacket is disposed around the outer periphery of the delivery pipe for circulating a constant flow of water or other coolant throughout substantially the entire length of the delivery pipe, thus cooling the area immediately surrounding the delivery pipe and protecting the apparatus from damage which may otherwise be caused by the excessively high temperatures resulting from the mixture of effluent and pure oxygen. The cooling jacket is provided with concentrically arranged flow passageways, the passageways being in open communication at one end thereof. The innermost passageway is open to a coolant inlet means for receiving a supply of coolant therein whereby the coolant may flow by gravity, or may be forced through the innermost passageway in one direction and moved in a reverse direction through the outermost passageway. The outer end of the outermost passageway is open to a coolant outlet means whereby the circulated coolant may be discharged from the cooling jacket and may be either discarded, or cooled and recirculated through the cooling jacket. The cross-sectional area or volumetric space of the coolant passageways is important or critical to the overall efficient operation of the oxygen delivery apparatus in that the coolant must flow relatively freely in both directions to avoid any stopping or slowing of the flow of the coolant at the point of direction reversal thereof. The coolant is normally reversed in direction of movement in an area wherein the apparatus which is subjected to the high temperatures encountered in the secondary reformer operation, and any time lag in the movement of the coolant at this reversal point may result in a boiling of the coolant, which is a detriment to the operation of the cooling jacket in the cooling of the delivery or injector mechanism. The novel oxygen injector means is simple and efficient in operation and economical and durable in construction.

DETAILED DESCRIPTION OF THE PREFERRED EMBODIMENT

Figure 1:
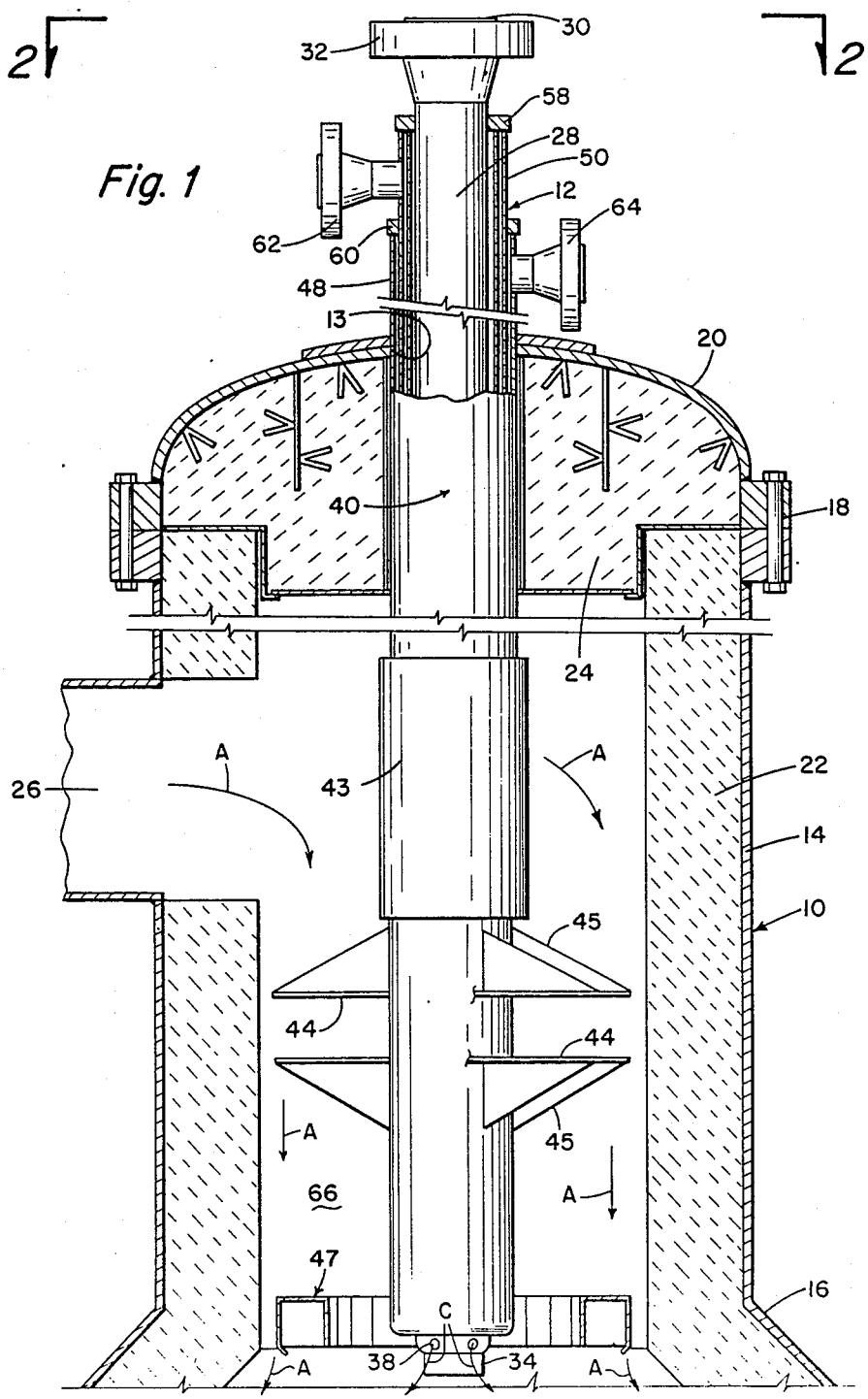
FIG. 1 is an elevational view, partly in section, of an oxygen injector apparatus embodying the invention and illustrated as installed in a typical secondary reformer apparatus.
Figure 2:
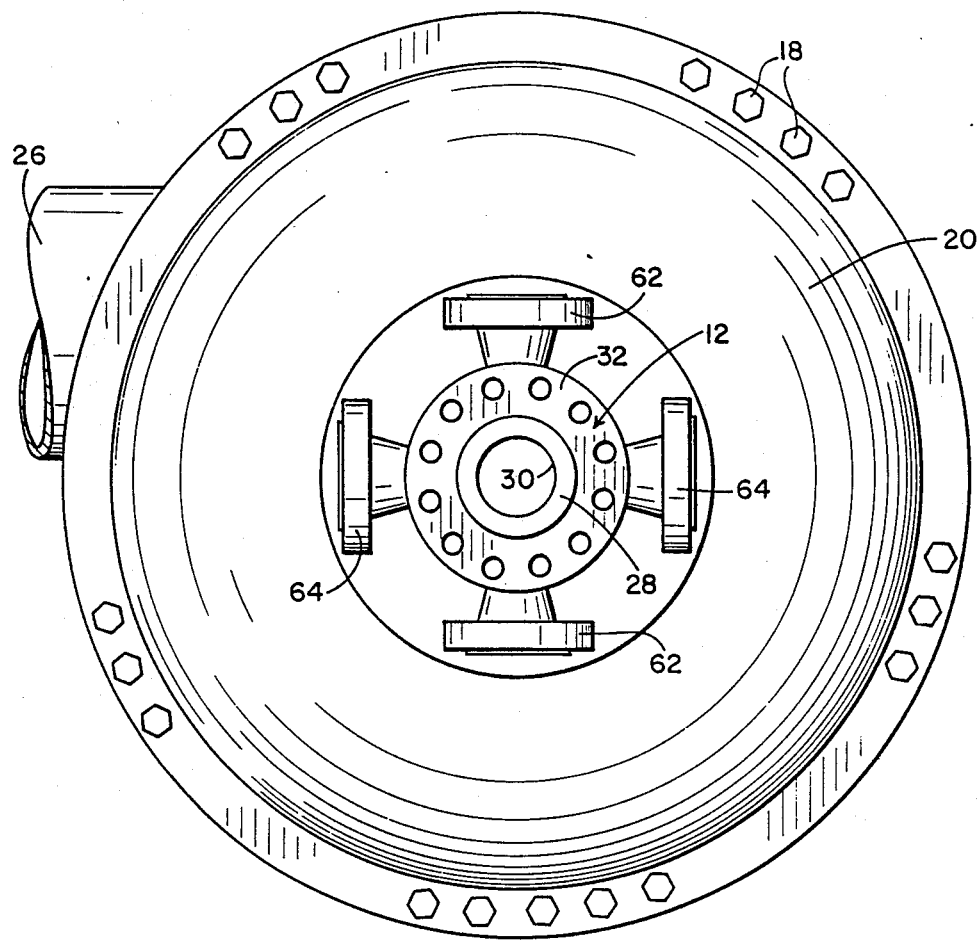
FIG. 2 is a view taken on line 2—2 of FIG. 1.

Referring to the drawings in detail, reference character 10 generally indicates a secondary reformer apparatus having an oxygen delivery or injector means 12 installed in combination therewith. The secondary reformer apparatus 10 may be of any suitable type, and as shown herein comprises a housing 14 having one end 16 thereof flared outwardly for connection with a suitable reaction vessel (not shown), or the like, normally utilized in a secondary reformer operation. The opposite end of the housing 14 is normally open and may be provided with an outwardly extending peripheral flange 18 for receiving one end of a suitable domed head means 20 thereagainst. The head means 20 may be bolted, or otherwise secured to the open end of the housing 14, as is well known. The housing 14 is preferably constructed from a suitable metallic material such as carbon steel lined with refractory material 22, and the head member 20 is also preferably constructed from a similar metallic material lined or filled with a refractory material 24. In addition, an inlet port 26 is provided for the housing 14 and refractory lining 22 thereof, the inlet port being in communication with the effluent or exhaust emanating from any suitable primary reformer process (not shown), as is well known. The effluent from the primary reformer is directed into the interior of the housing 14 and is directed therethrough in a manner and for a purpose as will be hereinafter set forth.

Figure 3:
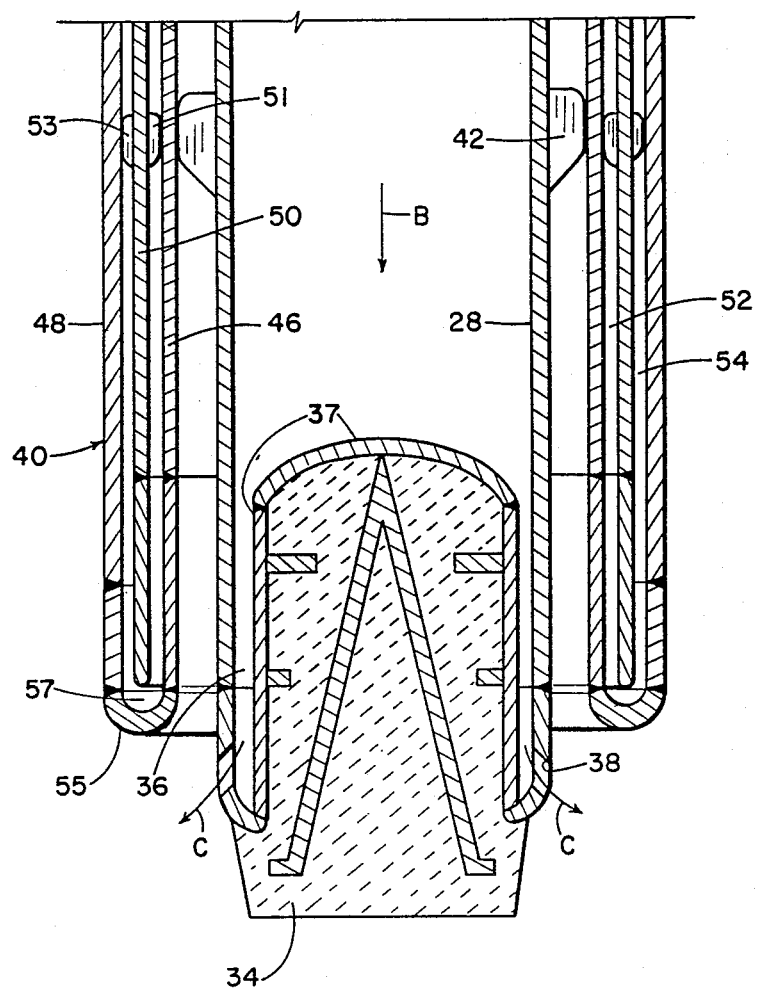
FIG. 3 is an enlarged sectional elevation view of one end of an oxygen injector apparatus embodying the invention.

The oxygen injector means 12 extends through a port 13 provided in the head 20 and comprises a central pipe or tube member 28 concentrically arranged within the head 20 and housing 14 and has one open end 30 in communication with a suitable source of oxygen (not shown). The end 30 may be secured to the oxygen source (not shown) in any suitable manner, such as by a bolt flange means 32, as is well known, whereby a supply of oxygen, or oxygen in combination with steam, or the like, may be directed into and through the pipe 28. The opposite end of the pipe 28 is closed by suitable metal closure means 37 and is protected from the excessively high temperature existing in the reactor vessel by a suitable refractory means 34 which extends longitudinally into the interior of the pipe 28 and projects outwardly therefrom, as particularly shown in FIG. 3. An annular passageway 36 is provided between the inner periphery of the pipe 28 and the outer periphery of the metal closure means 37 above the closed end of the pipe 28, and one or more circumferentially spaced outwardly directed jets or ports 38 are provided in the wall of the pipe 28 substantially immediately inboard of the refractory means 34. The jets or ports 38 provide communication between the interior of the pipe 28 and the interior of the reactor vessel whereby the oxygen moving through the pipe 28 will be injected into the path of the effluent during a secondary reformer operation, as will be hereinafter set forth.

A cooling jacket assembly 40 is concentrically arranged around the outer periphery of the pipe 28. It is preferable that the inner periphery of the cooling jacket assembly 40 be radially spaced from the outer periphery of the pipe 28, and suitable centering gussets 42, or the like, may be interposed between the pipe 28 and the inner periphery of the cooling jacket 40 for maintaining the concentrical relationship therebetween. In addition, a jacket or sleeve means 43 is secured around the outer periphery of the cooling jacket assembly 40 in any suitable manner (not shown) and disposed in substantial alignment with the inlet port 26. The sleeve 43 is preferably lined with a suitable refractory material (not shown) and the sleeve 43 thus protects the cooling jacket assembly 40 from the impact of the incoming effluent from the primary reformer process. This is of particular importance when it is considered that the effluent entering the housing 14 usually has a linear velocity in the neighborhood of one hundred feet per second and the temperature of the effluent may be as great as fifteen hundred degrees Fahrenheit.

It is desirable to provide a plurality of circumferentially and longitudinally spaced flanges 44 secured to the outer periphery of the cooling jacket assembly 40 and strengthening webs 45 for facilitating the distribution of the effluent in the housing 14, all as is well known. In addition, a suitable flange means 47 may be suitably secured around the lowermost end of the oxygen injector assembly 12, if desired, and as particularly shown in FIG. 1, for centering the overall installation of the assembly 12 within the refractory 22 and for effluent distribution.

The cooling jacket assembly 40 comprises an inner pipe or sleeve 46 surrounding the outer periphery of the pipe 28, and concentrically arranged with respect to an outer pipe or sleeve 48. An intermediate sleeve or cylindrical partition 50 is interposed between the sleeves 46 and 48 to provide a pair of longitudinally extending, mutually parallel passageways 52 and 54 of annular configuration. Of course, a plurality of centering gussets 51 and 53 may be interposed between the partition 50 and sleeves 46 and 48, respectively, for maintaining the concentric relationship therebetween, as is well known. The passageways 52 and 54 extend substantially throughout the length of the cooling jacket assembly 40, and the lowermost ends of the sleeves 46 and 48 are interconnected by a closure means 55 which provides communication between the passageways 52 and 54 and provides a closed end therefor. The partition 50 terminates at its lower end, as viewed in the drawings and as particularly shown in FIG. 3, at a point spaced from the inner periphery of the closure means 55 thus forming a connecting passageway 57. It is to be noted that the distance between the terminus of the partition 50 and the inner periphery of the closure means, as well as the radial distance between the partition 50 and the sleeves 46 and 48 is of particular importance. The dimension must be sufficiently great as to provide for a substantially free flow of coolant through the passageway 52, around the lower end of the partition 50, and through the passageway 54, thus precluding any slow-down of the movement of the coolant at the lowermost point connecting the two passageways 52 and 54. The extreme heat in the secondary reformer process will cause the coolant in the connecting means 57 to boil if the movement or flow of the coolant is not sufficiently fast.

It is also important that the dimensions be sufficiently small as to permit the utilization of a reasonable quantity of coolant and maintain a suitably high velocity for movement through the passageways 52 and 54 during the secondary reformer process, as will be hereinafter set forth. If the volume of coolant required is too great, the practical handling of the coolant becomes a problem.

The uppermost ends of the inner sleeve 46 and partition 50 preferably extend upwardly beyond the uppermost limit of the outer sleeve 48, as particularly shown in FIG. 1. The annular space formed by the upper ends of the sleeve 46 and partition 50 may be closed by a suitable annular plate 58, and the annular space formed by the uppermost end of the outer sleeve 48 and partition 50 may be closed by a similar annular plate 60 at a point spaced below the plate 58. At least one, and preferably a plurality of coolant inlets 62 are provided or secured to the partition 50 above the plate 60 and is in communication with a source of coolant (not shown) for directing a supply of coolant into the upper portion of the passageway 52. At least one, and preferably a plurality of outlet ports 64 are provided or secured to the outer sleeve 48 below the plate 60 for receiving coolant discharging from the upper portion of the passageway 54.

In operation, the effluent from the primary reformer process (not shown) enters the inlet port 26 and flows downwardly through the annulus 66 between the inner periphery of the refractory 22 and the outer periphery of the oxygen injector assembly 12, and as shown by the arrows A in FIG. 1. The effluent moves through and out of the housing 14 and into the reactor or the like (not shown) which normally contains a suitable catalyst and is well known in the secondary reformer art. As the effluent is moving through the annulus 66, a supply of oxygen is admitted into the pipe 28 through the open upper end 30 thereof. Of course, it is to be understood that steam, or the like, may be introduced into the pipe 28 simultaneously with or in combination with the oxygen, if desired. The oxygen is normally at a temperature of approximately eight hundred fifty degrees Fahrenheit within the pipe 28 and moves longitudinally through the pipe 28 as indicated by the arrow B in FIG. 3. The oxygen is discharged from the interior of the pipe 28 through the jets or ports 38 as indicated by the arrows C. The oxygen emerging from the ports 38 mixes with the effluent as it is leaving the housing 14 and entering the reactor (not shown) for the secondary reformer operation.

As hereinbefore set forth, the admission of essentially pure oxygen through the pipe 28 for mixing with the effluent greatly increases the burning efficiency of the combustible components of the effluent, and the temperature generated within the reactor and transmitted to the lower end of the injector assembly 12 may be as great as three thousand degrees Fahrenheit, or more. In order to moderate the ambient heat conditions immediately surrounding the outer periphery of the pipe 28 or apparatus 12, a supply of coolant of a sufficiently low temperature is admitted into the passageway 52 through the coolant inlet port or ports 62. The coolant moves longitudinally through the passageway 52 in a direction toward the closure means 55, where the direction of flow of the coolant reverses and the coolant continues to flow through the passageway 54 in a direction toward the coolant outlet port or ports 64. The coolant may be withdrawn from the apparatus entirely as it leaves the passageway 54 and discarded, or may be cooled to a usable temperature for recirculation through the passageway 52, as desired. As hereinbefore set forth, it is important that the cross sectional area of the passageways 52 and 54 and the distance between the terminus of the partition 50 and the inner periphery of the closure means 55 be sufficiently great as to preclude hindrance or interference with the free flow of the coolant as it reverses direction, and yet must not be so great as to require an unrealistic volume of coolant for movement through the cooling jacket 40.

From the foregoing, it will be apparent that the present invention provides a novel oxygen injector means for delivering oxygen to an effluent flow stream discharging from a primary reformer process for mixing with the effluent to increase the burning efficiency of the combustible components of the effluent in a secondary reformer operation. A cooling jacket assembly is disposed around the outer periphery of an oxygen delivery pipe for moderating the ambient temperature conditions surrounding the oxygen injector means and thus compensate for the increased temperature conditions within the secondary reformer apparatus with the use of substantially pure oxygen in lieu of air for mixing with the primary reformer exhaust.

The coolant may be any heat transfer medium such as, but not limited to, water, a water-antifreeze mixture, or oil.

Whereas the present invention has been described in particular relation to the drawings attached hereto, it should be understood that other and further modifications, apart from those shown or suggested herein may be made within the spirit and scope of this invention.

What is claimed is:

1. Apparatus for reforming a hot effluent stream consisting essentially of carbon monoxide, hydrogen and methane from a primary reformation process to reform methane with steam to form anhydrous ammonia, comprising a refractory lined housing formed of an upper cylindrical portion closed at its top and connected to an outwardly flared bottom portion;

inlet means in the upper cylindrical portion to receive said effluent from said primary reformation process;

an oxygen delivery tube and flow assembly centrally disposed through and from the top of the housing to a terminal end that is contiguous to the junction of the cylindrical portion and the outwardly flared bottom portion creating an annular zone opposite said cylindrical portion for downward flow of the effluent stream; the flow assembly comprising a closure means attached at the bottom of the oxygen delivery tube and formed of an inverted cylindrical metallic container of diameter less than the inside diameter of the oxygen delivery tube and extending concentrically upward into the interior thereof to a top closure and thus forming an annular passageway substantially of constant width between the delivery tube and said metallic container, the container being filled with refractory which terminates about and below the end of the bottom of the oxygen delivery tube;

a plurality of oxygen discharge ports through the oxygen delivery tube adjacent the terminal end of the annular passageway, the ports oriented to create jets of oxygen in a downwardly and outwardly direction;

a cooling jacket concentrically spaced from and separately disposed around the outer periphery of the oxygen delivery tube forming a static gas space, the bottom of the jacket being disposed slightly above the oxygen discharge ports, the jacket including a concentrically arranged first passageway for flowing a coolant fluid in a downwardly direction for communication at the bottom with a second passageway for return flow of the coolant fluid in a reverse direction; and means to cause the flow of the coolant fluid into said cooling jacket.

2. Apparatus of claim 1 wherein the first passageway is an inner passageway, and the second passageway is an outer passageway.

* * * * *